(12) United States Patent
Jackel et al.

(10) Patent No.: US 6,725,268 B1
(45) Date of Patent: Apr. 20, 2004

(54) SYSTEM AND METHOD FOR PROVIDING STATUS INFORMATION FROM MULTIPLE INFORMATION SOURCES IN A SINGLE DISPLAY

(75) Inventors: Lawrence David Jackel, Holmdel, NJ (US); Urs A Muller, Keyport, NJ (US)

(73) Assignee: AT&T Corp., New York, NY (US)

( * ) Notice: Subject to any disclaimer, the term of this patent is extended or adjusted under 35 U.S.C. 154(b) by 635 days.

(21) Appl. No.: 09/635,742

(22) Filed: Aug. 11, 2000

(51) Int. Cl.$^7$ .............................................. G06F 15/16
(52) U.S. Cl. ........................ 709/227; 709/225; 345/736; 345/333
(58) Field of Search .................. 709/224, 206–207, 709/227, 225; 345/736, 734, 771–772, 733, 717, 333

(56) References Cited

U.S. PATENT DOCUMENTS

| | | | | |
|---|---|---|---|---|
| 5,893,091 A | * | 4/1999 | Hunt et al. ..................... | 707/3 |
| 5,908,467 A | * | 6/1999 | Barrett et al. ............... | 709/218 |
| 5,913,040 A | * | 6/1999 | Rakavy et al. ............... | 709/232 |
| 5,951,652 A | * | 9/1999 | Ingrassia et al. ............ | 709/248 |
| 5,953,005 A | * | 9/1999 | Liu .......................... | 715/500.1 |
| 5,958,008 A | * | 9/1999 | Pogrebisky et al. ........ | 709/223 |
| 6,250,428 B1 | * | 6/2001 | Amo et al. ................. | 187/391 |
| 6,285,985 B1 | * | 9/2001 | Horstmann .................. | 705/14 |
| 6,301,590 B1 | * | 10/2001 | Siow et al. .................. | 715/500 |
| 6,301,609 B1 | * | 10/2001 | Aravamudan et al. ...... | 709/207 |
| 6,313,880 B1 | * | 11/2001 | Smyers et al. .............. | 348/552 |
| 6,317,783 B1 | * | 11/2001 | Freishtat et al. ............ | 709/218 |
| 6,343,313 B1 | * | 1/2002 | Salesky et al. ............. | 709/204 |
| 6,405,245 B1 | * | 6/2002 | Burson et al. .............. | 709/217 |
| 6,421,708 B2 | * | 7/2002 | Bettis ......................... | 709/206 |
| 6,438,580 B1 | * | 8/2002 | Mears et al. ................ | 709/204 |
| 6,446,124 B1 | * | 9/2002 | Collins et al. .............. | 709/224 |
| 6,489,935 B1 | * | 12/2002 | Amundsen ................... | 709/206 |
| 6,493,748 B1 | * | 12/2002 | Nakayama et al. ......... | 709/218 |
| 6,510,452 B1 | * | 1/2003 | Brisebois et al. ........... | 709/204 |
| 6,519,050 B1 | * | 2/2003 | Eintracht et al. .......... | 358/1.15 |
| 2001/0035877 A1 | * | 11/2001 | Killian ....................... | 345/744 |
| 2001/0050679 A1 | * | 12/2001 | Shigeta ....................... | 345/204 |
| 2003/0014494 A1 | * | 1/2003 | Bettis ......................... | 709/206 |
| 2003/0020671 A1 | * | 1/2003 | Santoro et al. ............. | 345/1.3 |

* cited by examiner

*Primary Examiner*—Krisna Lim (57) ABSTRACT

The present invention is a system and method for providing and displaying information collected from a variety of information providers such as an electronic mail server or an information content server. Each of the variety of information providers provides information updates which are captured and rendered in a variety of status images which are provided to a user via a Web page or similar facility. The display of information on the Web page is robust against displays from one or more of the information providers since each of the status images and the remainder of the Web page content are rendered independently.

20 Claims, 6 Drawing Sheets

SYSTEM AND METHOD FOR PROVIDING STATUS INFORMATION FROM MULTIPLE INFORMATION SOURCES IN A SINGLE DISPLAY

BACKGROUND OF THE INVENTION

The present invention relates to the World Wide Web and more particularly to a system and method for providing and displaying information in a World Wide Web browser.

Over the past few years, there has been an explosive increase in the use of the Internet for communication, data transfer, research and recreation. Businesses, educational institutions, individuals, and governments are beginning to use the Internet for everything from personal communications to mission-critical commercial negotiations and transactions. There is now a staggering array of information and content sources and providers available through the Internet, offering up information such as individual stock and portfolio quotations, sporting news and game/event scores, news updates, electronic mail services, etc.

However, a negative consequence of having so many information sources and providers is that accessing all of these information sources and providers in a simple, efficient and intuitive manner can be a difficult process. For example, if a user wishes to view information from multiple electronic mail accounts, the user will typically have to logon separately to each electronic mail provider to view any updated status information about each account. If one or more electronic mail servers are delayed or down for some reason, the user's access to this information will be severely limited or, at a minimum, be time consuming. Similarly, if a user wishes to view other types of status updates via their browser software, such as up to date stock quotations and sports scores, the user may have to endure lengthy delays if one or more of the servers providing such information is delayed or down.

Accordingly, it would be desirable to be able to check the status of information from multiple information providers, such as provided by information content servers and electronic mail servers, in one simple and intuitive fashion whereby the user would be able to view information from all the information sources in a single display without having the entire display being compromised by a delay at one or more of the multiple information providers.

SUMMARY OF THE INVENTION

The present invention is a method for providing and displaying status information from multiple information providers, such as electronic mail servers and information content servers which may provide information related to any number of topics such as health and medicine, weather, entertainment, sports, etc.

In one embodiment of the present invention, the method for providing status information from multiple information servers includes receiving a request for status information from the multiple information servers, acquiring status information from each of the multiple information servers and rendering status images related to the status information received from each of the multiple information servers, wherein the rendering of any one of the status images is not affected by any delay in acquiring status information from any one of the other multiple information servers.

In another embodiment of the present invention, the method for providing a visual representation of information collected from a variety of information sources for display in a single Web page includes receiving a request for information from a plurality of information sources, processing the request for information from the plurality of information sources and displaying the information from each of the plurality of information sources, wherein the information is displayed in a plurality of status images, each of which represent a single information source.

In the present invention, a screen display may be provided to the user which contains a number of status images, each of which relates to a distinct information provider. Each status image may provide the user with information specified by the user, such as in the case of electronic mail, the number of new messages the user has in each electronic mail account. The status images may be updated automatically on a periodic basis or the status images may be updated as soon as a request for information from the user is received.

DETAILED DESCRIPTION OF THE INVENTION

Figure 1:
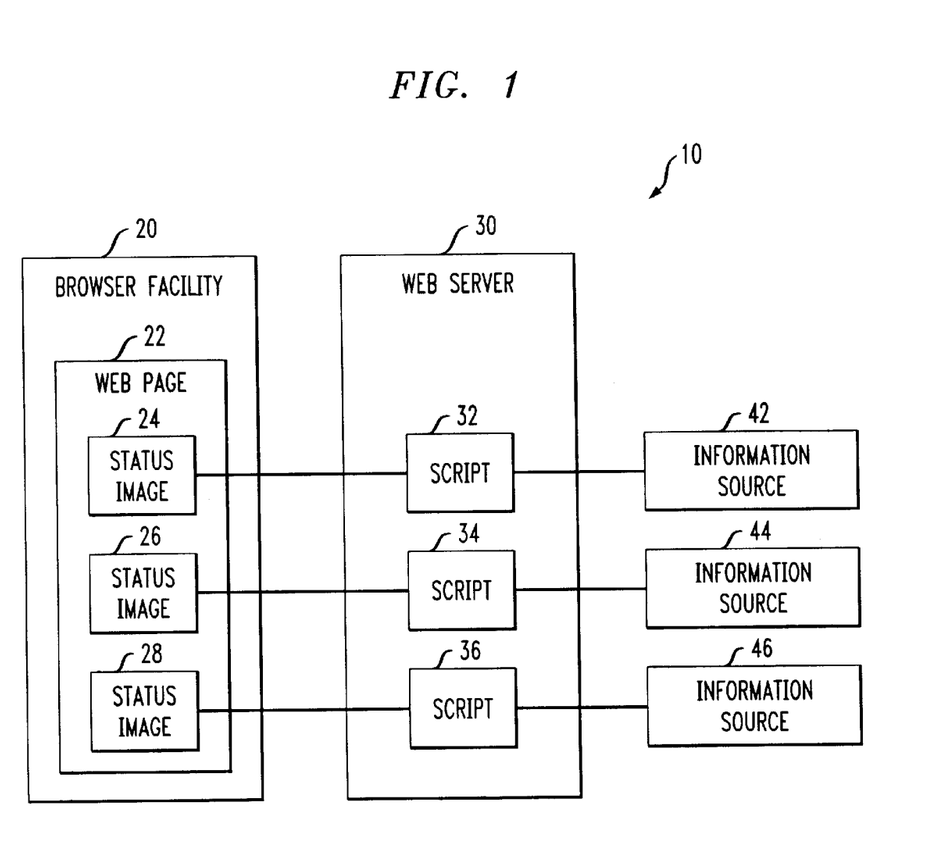
FIG. 1 illustrates a system in accordance with the teachings of the present invention.

Referring to FIG. 1, a system 10 for providing status information from multiple information sources is shown. As used herein, the term "information sources" may include any number of information source providers available via the Internet, such as electronic mail servers, information content server and other such servers which provide information to users on the Internet. For exemplary purposes, the present invention will be described in more detail later herein with emphasis on a system which accesses electronic mail information from multiple electronic mail servers. However, the present invention may be used to access information from a variety of multiple information sources or servers in addition to electronic mail servers, such as stock quotation servers, entertainment information servers, sports event and game information servers, weather information servers and others. For example, the present invention may be used to simultaneously access information from an electronic mail server, a sporting event and game information server and a weather information server, such that a user will be able to view information provided from all the different servers in a single display whereby delayed information from one or more of the servers will not delay display of information from the other servers.

Referring again to FIG. 1, the system 10 includes at least one browser facility 20 which is in communication with a Web server 30 which accesses information from a variety of information sources 42, 44 and 46, which themselves may be also Web servers. The browser facility 20 provides a user with access to a World Wide Web (Web) page 22 which provides a display of status information from the variety of information sources 42, 44 and 46. As used herein, the term "status information" refers to up to date or current information which may be provided by each of the information sources. Such status information may include information such as current stock quotes, weather forecasts, the number of new electronic mail messages in a user's account, sports scores, etc. In one embodiment of the present invention, the Web page 22 displays a number of status images 24, 26 and 28 which provide status information related to the information sources which a user has selected. For example, in the case of electronic mail, the status images 24, 26, 28 may provide the user with information such as the number of new messages in each of the user's electronic mail accounts and other related electronic mail information. The status images 24, 26 and 28 may also provide other types of information to the user as discussed earlier herein, such as stock quotes, sports scores, weather information, etc.

In one preferred embodiment of the present invention, the status images 24, 26 and 28 are generated by programs or scripts running on Web server 30 for eventual display on Web page 22. More specifically, the status images 24, 26 and 28 are generated, respectively, by a number of server side programs or scripts 32, 34 and 36 which reside on Web server 30. The status images 24, 26 and 28 will preferably be requested by browser facility 20 in a parallel fashion such that any delay in generating any one or more of the status images will not unduly influence the speed of the rest of the Web page 22. In one embodiment of the present invention, the same Web server which hosts Web page 22 will also contain the server side programs or scripts 32, 34 and 36.

In the present invention, the server side programs or scripts 32, 34 and 36 are in communication with a number of information sources 42, 44 and 45 from which the user's desired status information may be retrieved. In one embodiment, information sources 42, 44 and 45 may be electronic mail servers or alternatively, information sources 42, 44 and 45 may also be other types of servers such as stock information servers, sports and entertainment information servers and weather information servers. In the present invention, the server side programs or scripts may be common gateway interface (CGI) programs or scripts written in languages such as C, C++, Java, and Perl. In alternative embodiments of the present invention, the actual program or script code may be actually embedded within the Web page 20 such as via an Active Server Page (ASP) or other similar configuration, as discussed in more detail later herein.

With reference to FIG. 1, although three related status images, scripts and information sources are shown, many other combinations are possible. For example, in the case of electronic mail, a user may have four electronic mail accounts and thus four electronic mail status images would be generated and provided to the user. Furthermore, a user may have two or more electronic mail accounts from a single electronic mail service provider and in such a case, two or more server programs or scripts may be in communication with a single electronic mail provider or server. Server programs or scripts may also be combined, especially in a scenario where a user may have multiple accounts with a single electronic mail service provider. Thus, a single script may access the multiple accounts with the single electronic mail service provider and then generate a single electronic mail status image containing the information from the multiple accounts or alternatively, multiple individual images corresponding to each account from the single electronic mail service provider may be generated.

Figure 2:
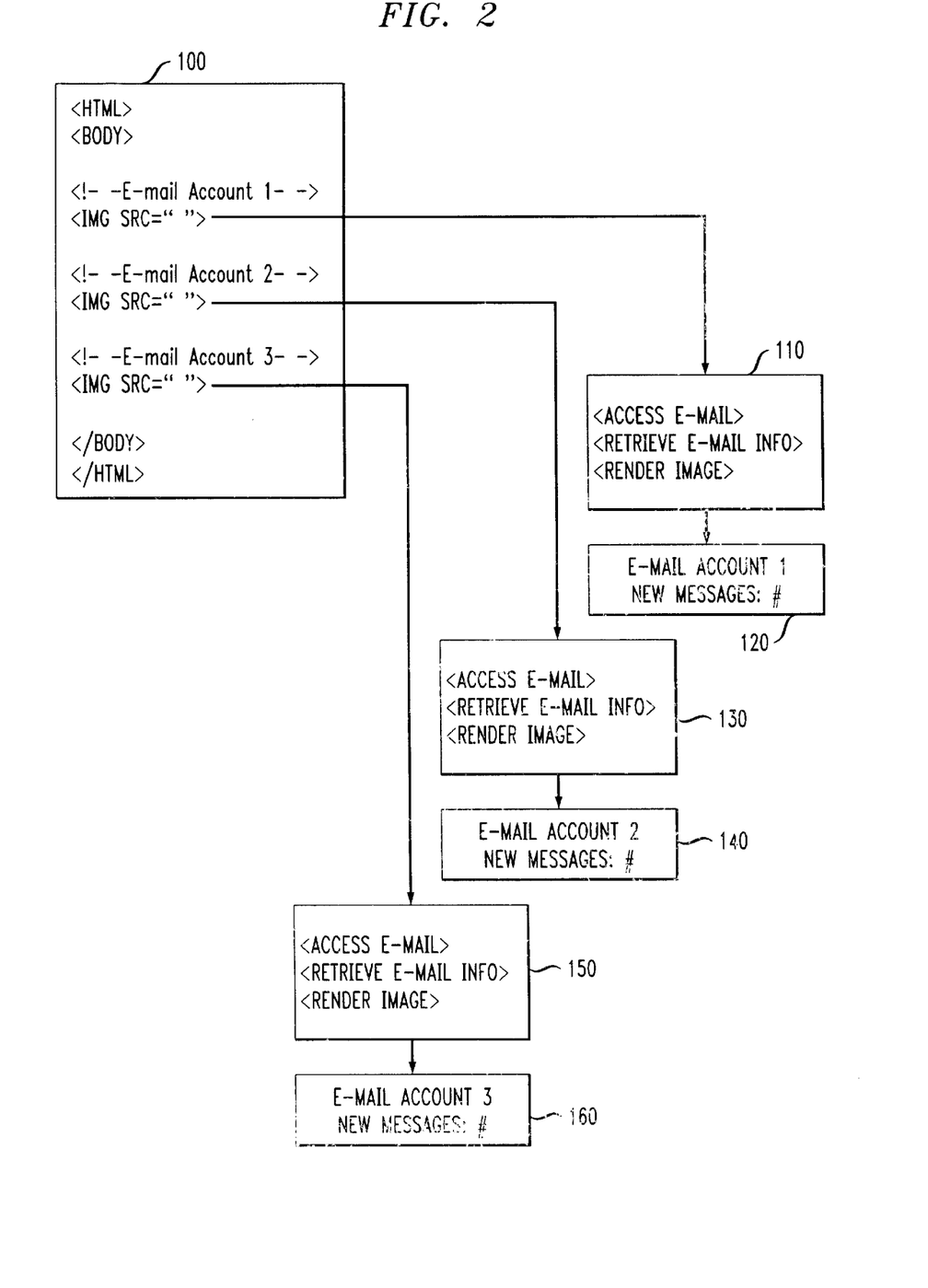
FIG. 2 illustrates an exemplary pseudo code diagram in accordance with the teachings of the present invention.

Referring to FIG. 2, a pseudo code diagrammatic representation of the present invention with an emphasis on electronic mail for merely exemplary purposes is shown. The system includes a Web page 100 which contains code configured to provide status information on multiple electronic mail accounts to a user. In the present exemplary embodiment, the user is assumed to have three electronic mail accounts which are designated in Web page 100 by pseudo code comment headers<!- -E-mail Account 1 - ->,<!- -E-mail Account 2 - ->and<!- -E-mail Account 3 - ->respectively. Following each comment header are pseudo code references or pointers to a program or script for generating an appropriate status image for each respective electronic mail account. In the case of HTML, the status image reference may be in the form of an "IMG SRC=" tag which will reference an appropriate program or script URL to access, as discussed earlier herein. In one exemplary embodiment, the URL may be as follows:

<IMG SRC="http://sample.att.net/cgi-bin/statusindicator.cgi?mbox=xyz"> wherein "sample.att.net/cgi-bin" is the network location of the program or script, "statusindicator.cgi" is the program or script name and the "mbox=xyz" portion are certain electronic mail account parameters used by the script. Such parameters may be a description or "handle" of the particular user's electronic mail account for which status information was requested and/or the parameters may contain any related login names, password, IDs, etc. needed by the script to access the user's electronic mail account or accounts.

In alternative embodiments, the program or script code may actually be embedded entirely or partially within the Web page source code itself. For example, with reference again to FIG. 2, pseudo code comment headers<!- -E-mail Account 1 - ->,<!- -E-mail Account 2 - ->and<!- -E-mail Account 3 - ->may be followed by actual program or script code for performing the functions of accessing the user's electronic mail accounts, retrieving the electronic mail status information and rendering the status image containing the account status information. Such code may be in any number of languages, such as Javascript, which may be executed by a browser.

In operation, the user's browser requests the appropriate status image from a server by passing the server the URL: "http://sample.att.net/cgi-bin/statusindicator.cgi?mbox=xyz". The server will fulfill the user's request by running the referenced script, i.e. "statusindicator.cgi" which will access the user's electronic mail account information and render the associated status image associated with that specific electronic mail account. Referring again to FIG. 2, some pseudo code for an exemplary script is shown in scripts 110, 130 and 150. For example, when activated, each script may access the user's electronic mail account<ACCESS E-MAIL>, retrieve the desired electronic mail status information<RETRIEVE E-MAIL INFO> and then render the appropriate electronic mail status image<RENDER IMAGE>. The rendered output of the script, i.e. the status image, is sent back to the browser. Typically, the output, i.e. the status image, is in form of a MIME document. Preferably, the MIME type will be "image/gif" or any other type of image which is recognizable by the browser and will be displayed properly in the browser. Referring once again to FIG. 2, status images 120, 140 and 160 may be generated and displayed for the user in the user's browser. Typically, information such as the account name and the number of new messages in each respective account is provided to the user in the rendered output status image.

Figure 3:
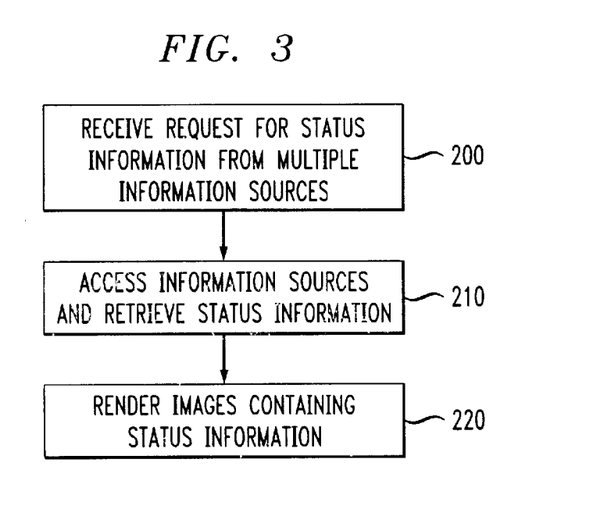
FIG. 3 is a flow chart which illustrates an exemplary method in accordance with the teachings of the present invention.

Referring to FIG. 3, an exemplary method for providing and displaying status information is shown. In the present invention, a request for status information from multiple information source providers is received, step 200. The request may be in the form of an HTML request, such as from a user's browser as discussed above. In response to the request, the information sources are accessed and the appropriate status information is retrieved from those information sources, step 210. In one embodiment of the present invention related to electronic mail, the electronic mail accounts may be accessed via the CGI scripts as discussed above using the script parameters passed by the user's request. Once the appropriate status information is retrieved from the information sources, status images are rendered each of which incorporates the appropriate status information, step 220. The status images may be rendered in any number of formats such as in the Graphics Interchange Format (GIF), Joint Photographic Experts Group (JPEG) format and/or Moving Picture Experts Group (MPEG) formats wherein textual information such as the number of new messages in an electronic mail account may be rendered as bitmaps within the status image.

In some cases, it is acknowledged that at times a delay may be experienced in accessing or acquiring status information from one or more of the information sources. For example, in an embodiment accessing electronic mail server, one or more of the servers may be busy, down or unresponsive and thus the access of status information from those servers will be delayed or even outright denied. However, in the present invention, such a delay or delays will not adversely affect the accessing of information and the rendering of the status information related to the other non-delayed information sources. Since each status image is populated and rendered with status information in an independent fashion relative to the other status images and then requested by the browser in a parallel (rather than a serial-type) fashion, a user may still view information from these information sources without having to wait for any delayed status images. For example, if three status images are being rendered for a user and one of the status images is delayed, the user will still be able to view the other two status images since they will be rendered, for example, in GIF format in the user's browser. The delayed status image may be later rendered in the browser for the user or alternatively, the status image may never be rendered if, for example, the information source related to that status image is not functional.

In other embodiments of the present invention, the user's electronic mail accounts may be accessed automatically on a periodic basis. For example, the user's electronic mail accounts may be accessed on the half hour, hourly, daily or on some other time period. Thus, when a request for the account information is received, a status image will be generated which contains the most recent account information which was accessed on the last given time period. A database may be utilized on the server which administers the present system for storing the account information. Such periodic accessing may also be overridden by a user in that the user may specify that the user wants to have an up to the minute status of the user's electronic mail accounts whereby a real-time accessing of the user's account information would be performed to override the periodic accessing of such information.

Figure 4:
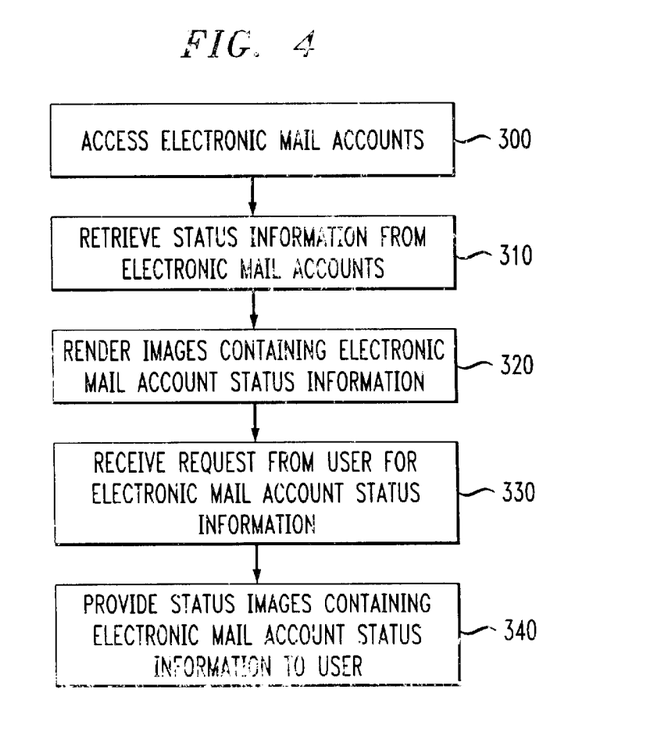
FIG. 4 is a flow chart which illustrates another exemplary method in accordance with the teachings of the present invention.

Referring to FIG. 4, another exemplary embodiment of a method for providing status information related to multiple electronic mail accounts is shown. In this embodiment, a user's electronic mail accounts are accessed, step 300. Typically, the user will provide the system with the required login information in order for the system to be able to properly access the user's electronic mail account. Such information may be provided in an encrypted or otherwise protected form in order to prevent unauthorized use of such information. Once the user's electronic mail accounts are accessed, status information is retrieved from the electronic mail accounts, step 310. The status information may be information such as the number of new message, the total number of messages, the number of unread messages, etc. The status information may also be updated stock quote information, entertainment and sports related information, weather information, etc. After the status information is retrieved, status images are rendered which contain the retrieved status information, step 320. A request may then be received from a user for status information relating to the user's electronic mail accounts, step 330. The rendered status images may then be provided to the user, step 340. The status images may be displayed on the user's display screen, such as on the display screen of their personal computer, Personal Digital Assistant, wireless telephone or other related device. It should again be emphasized that the delay of accessing information, such as in step 310, from one or more of the information sources, such as the discussed electronic mail server, will not delay the accessing and rendering of images related to the other of the multiple information sources. For example, if a user has requested access to information from a Server A, Server B and a Server C and Server B happens to be delayed or "down", the status information from Server A and Server B will still be able to be retrieved and the corresponding status images be rendered and displayed for the user.

Figure 5:
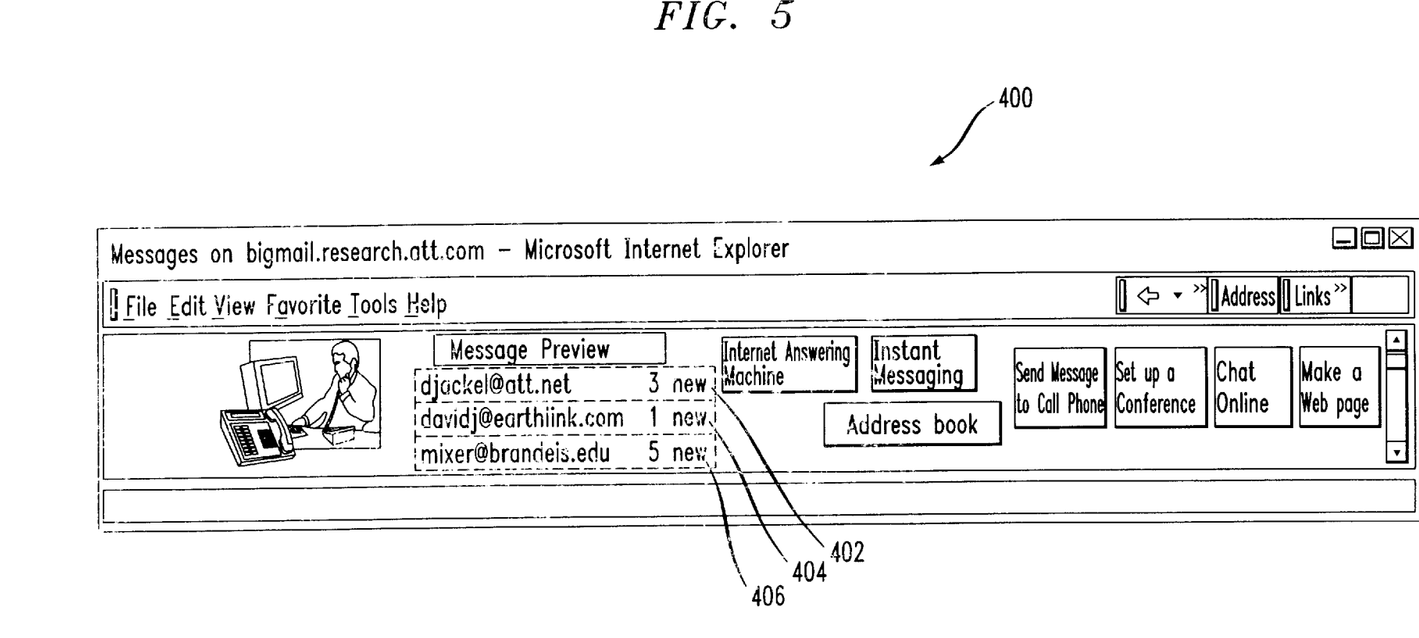
FIG. 5 is an exemplary screen display in accordance with the teachings of the present invention.

Referring to FIG. 5, an exemplary screen display 400 which provides electronic status information on multiple electronic mail accounts to a user is shown. The screen display 400 includes a number of status images 402, 404 and 406 which provide electronic mail account status information to the user. For example, status image 404 provides the account name and the number of new messages in that account to the user. Of course other information may be included in other embodiments, such as the total number of electronic mail messages in the account and even specific message header information if desired may also be included in the status image.

Figure 6:
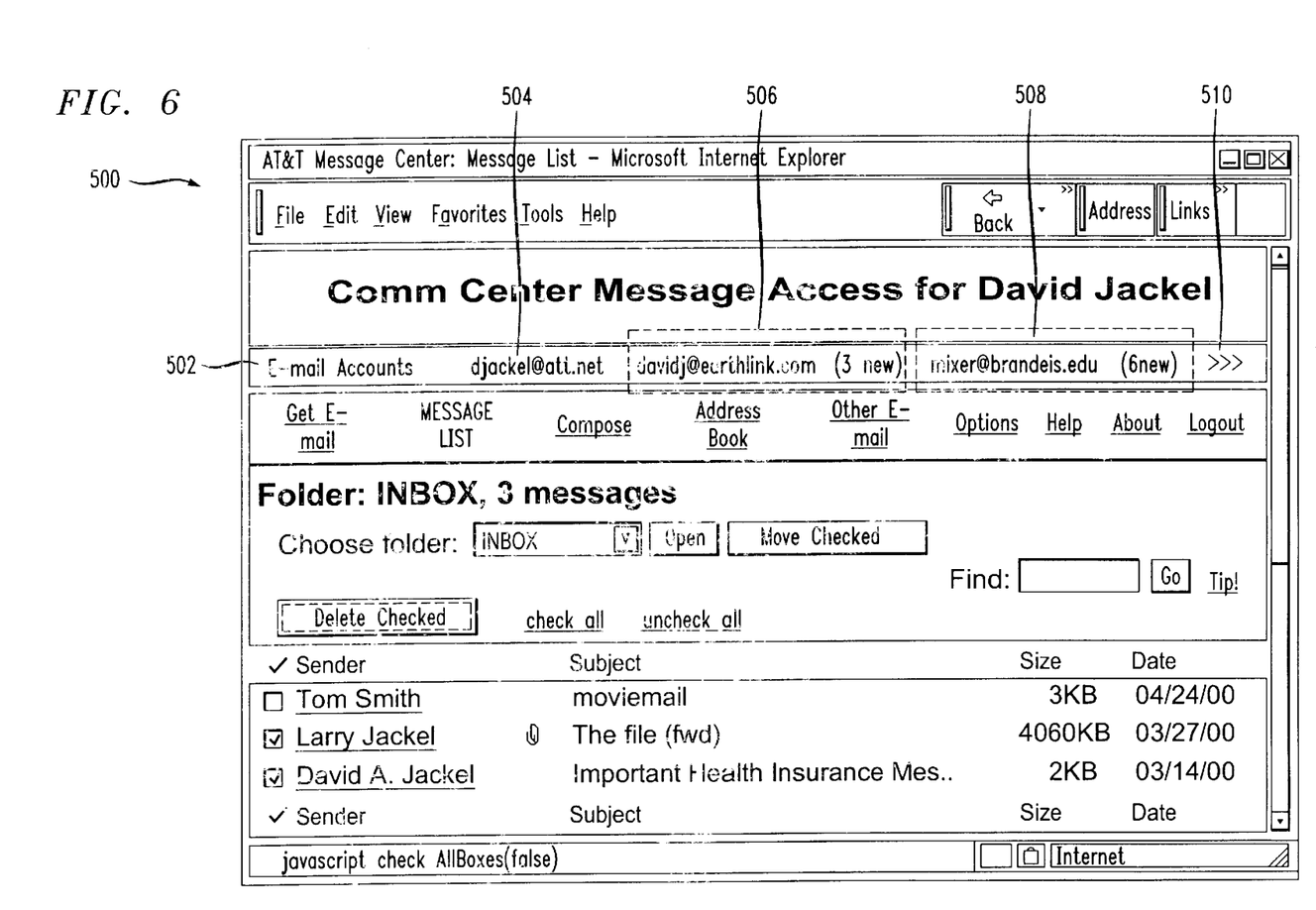
FIG. 6 is another exemplary screen display in accordance with the teachings of the present invention.

Referring to FIG. 6, another exemplary screen display 500 is shown. The screen display 500 includes a status bar 502 which lists a user's electronic mail accounts. For example, the status bar 502 may list an active electronic mail account 504 for which the associated account information may be provided below the status bar 502. The user's other electronic mail account information may be provided in the status bar via a series of status images 506 and 508. Other status images may be accessed by selecting a scrolling arrow 510 which will provide access to the other status images, if any are available. In one embodiment of the screen display, a user may select a status image to "activate" the respective electronic mail account associated with the specific status image. Thus, by activating the status image, the account information will be provided in more detail in the screen display, such as shown for account 504.

Figure 7:
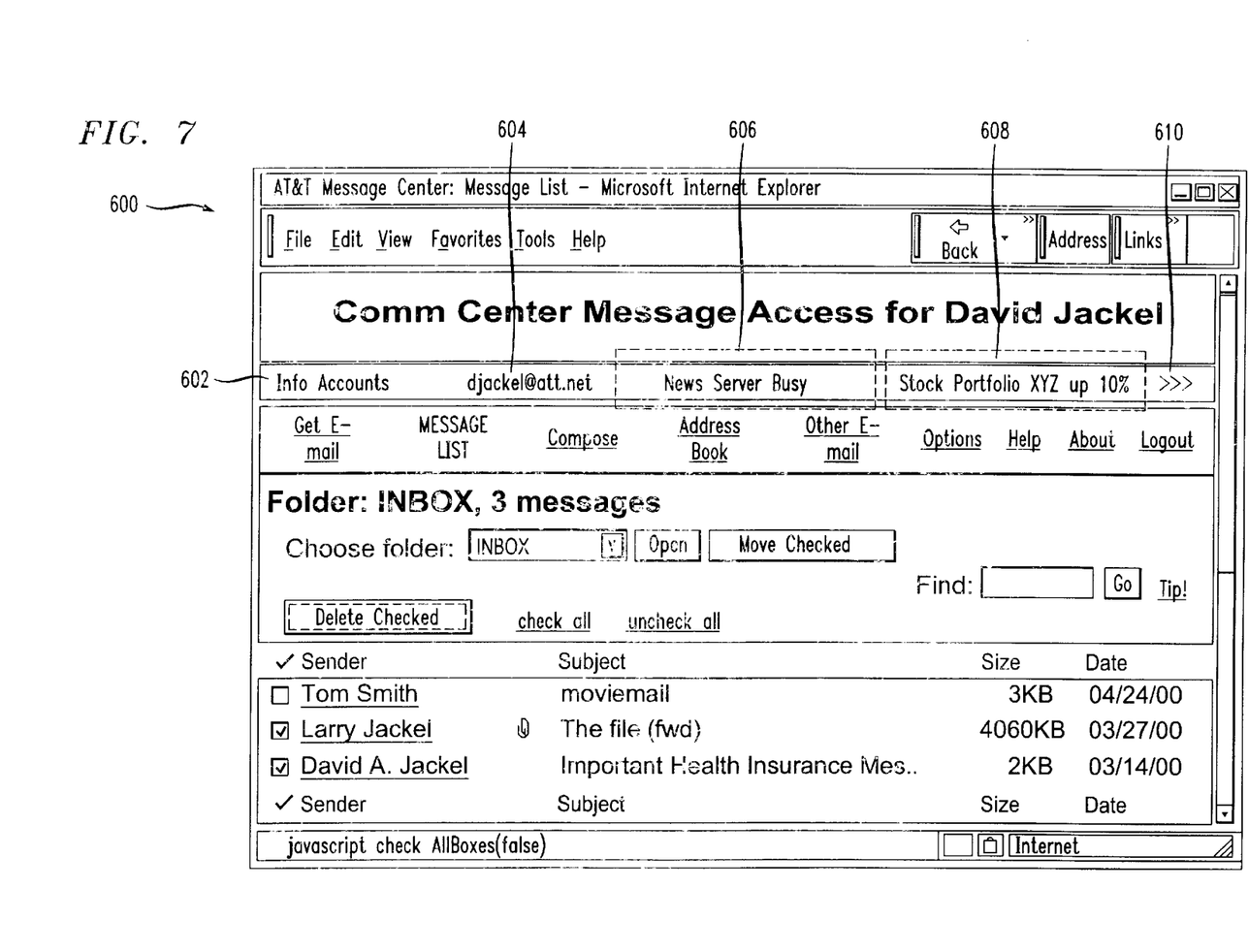
FIG. 7 is yet another exemplary screen display in accordance with the teachings of the present invention.

Referring to FIG. 7, yet another exemplary screen display 600 is shown. The screen display 600 includes a status bar 602 which lists a user's normally access information sources. For example, the status bar 602 may list an active electronic mail account 604 for which the associated account information may be provided below the status bar 602. The user's other information sources may be provided in the status bar 602 via a series of status images 606 and 608. In this example, status image 606 is a temporary status image which is displayed when the information source related to the status image is delayed, busy or down. Typically, in this embodiment, status image 606 would be displaying some news information item which has been selected by the user to be updated on. However, in this embodiment, even though the rendering of status image 606 is delayed, the information from the other status images, such as status image 608 is not affected. As shown in FIG. 7, status image 608 displays information related to an exemplary stock portfolio, such as the gain or loss associated with the portfolio. As discussed earlier herein, information such as individual stock quotes, weather information, etc. may be provided to the user via these status images. As with the embodiment shown in FIG. 6, other status images may be accessed by selecting a scrolling arrow 610 which will provide access to the other status images, if any are available.

In the present invention, electronic mail message communications as discussed herein may be made by any appropriate means of communicating data, some examples of which are a standard telephone system for communicating voice and data between remote locations, cable systems such as those currently being used for the communication of television and other signals, cellular or other wireless telephone networks, which like the standard telephone systems communicate voice and data between remote locations, and other similar communications systems. In an embodiment utilizing electronic mail information sources, the browser facility as discussed earlier herein may also include facilities for composing, sending, forwarding and receiving electronic mail over a network, such as the Internet, using protocols such as: Multi-purpose Internet Mail Extensions (MIME), Simple Mail Transport Protocol (SMTP), Post Office Protocol (POP) and Internet Message Access Protocol (IMAP). As used herein, the electronic mail message user may be an individual, company, organization or other entity from which electronic mail messages may be composed, sent, forwarded and received.

It will be apparent to those skilled in the art that many changes and substitutions can be made to the system and method described herein without departing from the spirit and scope of the invention as defined by the appended claims.

We claim:

1. A method for providing status information from multiple information servers, the method comprising:

receiving a request for status information from the multiple information servers;

acquiring status information from each of the multiple information servers; and rendering status images related to the status information received from each of the multiple information servers, wherein the rendering of any one of the status images is not affected by any delay in acquiring status information from any one of the other multiple information servers, wherein the acquiring and rendering steps are performed by code embedded at least partially within source code of the a Web page.

2. The method of claim 1, further comprising:

displaying the rendered status images in the web page, wherein the rendered status images are displayed as soon as they are individually rendered without regard to whether any one of the other status images are rendered.

3. The method of claim 1, wherein a temporary status image is provided for status images which are delayed in rendering.

4. The method of claim 1, wherein receiving a request for status information from the multiple information servers includes receiving login information related to one or more of the multiple information servers.

5. The method of claim 4, wherein the login information is an electronic mail login name and password.

6. The method of claim 1, wherein one or more of the multiple information servers is an electronic mail server.

7. The method of claim 1, wherein acquiring status information from each of the multiple information servers is performed on a periodic basis.

8. The method of claim 1, wherein the status images may be in any one of the following formats including GIF, JPEG, and MPEG.

9. The method of claim 1, wherein the request for status information identifies a server side CGI script which renders the status images.

10. A method for providing and displaying information received from multiple information provider sources, the method comprising:

providing a status indicator for each of the multiple information provider sources which includes:

receiving status information from each of the multiple information provider sources;

generating an original graphics image for each of the multiple information sources, wherein each respective graphics image contains status information from each of the multiple information sources, wherein each image is generated without regard to whether any one or more of the multiple information sources is delayed in providing status information; and displaying the generated images in a Web page, wherein the generating step is performed by code embedded at least partially within source code of the Web page.

11. The method of claim 10, wherein the status information is determined on an ad hoc basis.

12. The method of claim 10, wherein the status indicator for each of the multiple information provider sources is a GIF image.

13. The method of claim 10, wherein the multiple information provider sources are Web servers.

14. A method for providing a visual representation of information collected from a variety of information sources for display in a single Web page, the method comprising:

receiving a request for information from a plurality of information sources;

processing the request for information from the plurality of information sources; and displaying the information from each of the plurality of information sources in a Web page, wherein the information is displayed in a plurality of status images, each of which represent a single information source;

the processing and displaying steps being performed by code at least partially embedded within source code of the Web page.

15. The method of claim 14, wherein the request for information is an HTTP request.

16. The method of claim 14, wherein processing the request for information from the plurality of information sources includes separately accessing each of the plurality of information sources to acquire the requested information from each of the plurality of information sources.

17. The method of claim 14, wherein the status images are one of GIF, JPG, and MPEG image files.

18. The method of claim 14, wherein the status images are updated automatically with new information as provided by each of the plurality of information sources.

19. The method of claim 14, wherein each status image is displayed independently of each of the other status images whereby the display of the Web page is unaffected by a delay in displaying one or more status images.

20. The method of claim 14, wherein processing the request for information from the plurality of information sources includes rendering an individual status image related to a single information source.

* * * * *